United States Patent
Itakura

(10) Patent No.: US 8,098,449 B2
(45) Date of Patent: Jan. 17, 2012

(54) MAGNETIC RECORDING DEVICE, CONTROL DEVICE, AND MAGNETIC RECORDING DEVICE CONTROL METHOD

(75) Inventor: Akihiro Itakura, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 116 days.

(21) Appl. No.: 12/511,680

(22) Filed: Jul. 29, 2009

(65) Prior Publication Data

US 2010/0073801 A1   Mar. 25, 2010

(30) Foreign Application Priority Data

Sep. 22, 2008  (JP) ................... 2008-243176

(51) Int. Cl.
*G11B 5/09* (2006.01)
(52) U.S. Cl. ......................................................... 360/51
(58) Field of Classification Search .................. None
See application file for complete search history.

(56) References Cited

U.S. PATENT DOCUMENTS 5,905,705 A * 5/1999 Takeda et al. ................... 360/51
6,657,803 B1 * 12/2003 Ling et al. ....................... 360/53

FOREIGN PATENT DOCUMENTS

| JP | 8-138329 | 5/1996 |
|---|---|---|
| JP | A 2000-48352 | 2/2000 |
| JP | 2000-293804 | 10/2000 |
| JP | 2003-45120 | 2/2003 |
| JP | A 2003-157507 | 5/2003 |
| JP | A 2004-199806 | 7/2004 |
| JP | 2006-164349 | 6/2006 |

OTHER PUBLICATIONS

Japanese Office Action issued in Japanese App. No. 2008-243176, mailed Feb. 22, 2011.
Office Action issued by the Patent Office of Japan for related JP Application No. 2008-243176 mailed Sep. 6, 2011 (with English language translation).

* cited by examiner

*Primary Examiner* — Daniell L Negron
(74) *Attorney, Agent, or Firm* — Greer, Burns & Crain, Ltd.

(57) ABSTRACT

A magnetic recording device includes: a magnetic recording medium including a write-synchronization region and a data region; a correction-value-storage unit configured to store therein a phase-correction value for correcting a phase of the write clock; a reading unit configured to read out a signal from the magnetic recording medium; a write-clock generator configured to generate the write clock based on a write-reproduction signal which is a signal read out from the write-synchronization region by the reading unit; a phase-correction unit configured to correct the phase of the write clock generated by the write-clock generator based on the phase-correction value stored in the correction-value-storage unit; and a data acquisition unit configured to acquire data included in a data-reproduction signal which is a signal read out from the data region by the reading unit based on a clock that is generated by correcting the phase by the phase-correction unit.

9 Claims, 15 Drawing Sheets

MAGNETIC RECORDING DEVICE, CONTROL DEVICE, AND MAGNETIC RECORDING DEVICE CONTROL METHOD

CROSS-REFERENCE TO RELATED APPLICATION

This application is based upon and claims the benefit of priority from Japanese Patent Application No. 2008-243176, filed on Sep. 22, 2008, the entire contents of which are incorporated herein by reference.

FIELD

The embodiments discussed herein are directed to a magnetic recording device, control device, and a method for controlling the magnetic recording device.

BACKGROUND

In recent years, a magnetic recording medium called "patterned media", on which information can be high-densely recorded, has attracted attention. As illustrated in FIG. 15, a patterned medium is a medium whose magnetized regions (hereinafter called "land" arbitrarily) are arranged on a magnetic recording medium for record and reproduction. The magnetized regions are isolated from each other with non-magnetized regions.

The magnetic recording device, which uses such patterned media, records data by making a head magnetize the land at a timing when the head positions above the land. When reproducing the data, the magnetic recording device obtains the data by performing sampling of a reproduction signal read out from a data region at a predetermined timing. Therefore, in the magnetic recording device that uses the patterned media, it is required that the head writes the data on the land at an accurate timing and that the magnetic recording device obtains information by performing sampling of the reproduction signal at an optimum timing for the reproduction signal.

In recent years, a patterned medium that has a preamble at a head of a sector has been known. The preamble is, for example, for generating timing for data recording (hereinafter "write clock"). Such a patterned medium has a preamble for generating the timing for data reproduction (hereinafter "read clock") at a head of a data sector.

A patterned medium which has synchronization marks for synchronizing the write clock has also been known. The synchronization marks are arranged at predetermined intervals on a track of the patterned media. Even in such a patterned medium, a preamble for generating the read clock and the like is provided at the head of the data sector.

Examples of the patterned media technology are disclosed in Japanese Laid-open Patent Publications Nos. 2000-48352, 2004-199806, and 2003-157507.

SUMMARY

According to an aspect of the invention, a magnetic recording device includes a magnetic recording medium that includes a write-synchronization region on which information for generating a write clock is recorded, and a data region on which data is recorded. The write clock is a timing for writing data. The magnetic recording device further includes: a correction-value-storage unit configured to store therein a phase-correction value for correcting a phase of the write clock; a reading unit configured to read out a signal from the magnetic recording medium; a write-clock generator configured to generate the write clock based on a write-reproduction signal which is a signal read out from the write-synchronization region by the reading unit; a phase-correction unit configured to correct the phase of the write clock generated by the write-clock generator based on the phase-correction value stored in the correction-value-storage unit; and a data acquisition unit configured to acquire data included in a data-reproduction signal which is a signal read out from the data region by the reading unit based on a clock that is generated by correcting the phase by the phase-correction unit.

The object and advantages of the invention will be realized and attained by means of the elements and combinations particularly pointed out in the claims.

It is to be understood that both the foregoing general description and the following detailed description are exemplary and explanatory only and are not restrictive of the invention, as claimed.

DESCRIPTION OF EMBODIMENTS

The above-described patterned media have a problem that a storage capacity decreases. Specifically, the above-described patterned media have a preamble for each of the data sector for generating the read clock and the like, therefore the capacity for storing the data decreases.

Such a problem occurs not only in the patterned media but also in other recording media provided with the preamble for each of the data sector.

Preferred embodiments of the magnetic recording device, control device, and method for controlling the magnetic recording device are explained in detail below with reference to the accompanying drawings. However, the magnetic recording device, control device, and method for controlling the magnetic recording device disclosed by the present application are not limited to the embodiments below.

[a] First Embodiment

Figure 1:
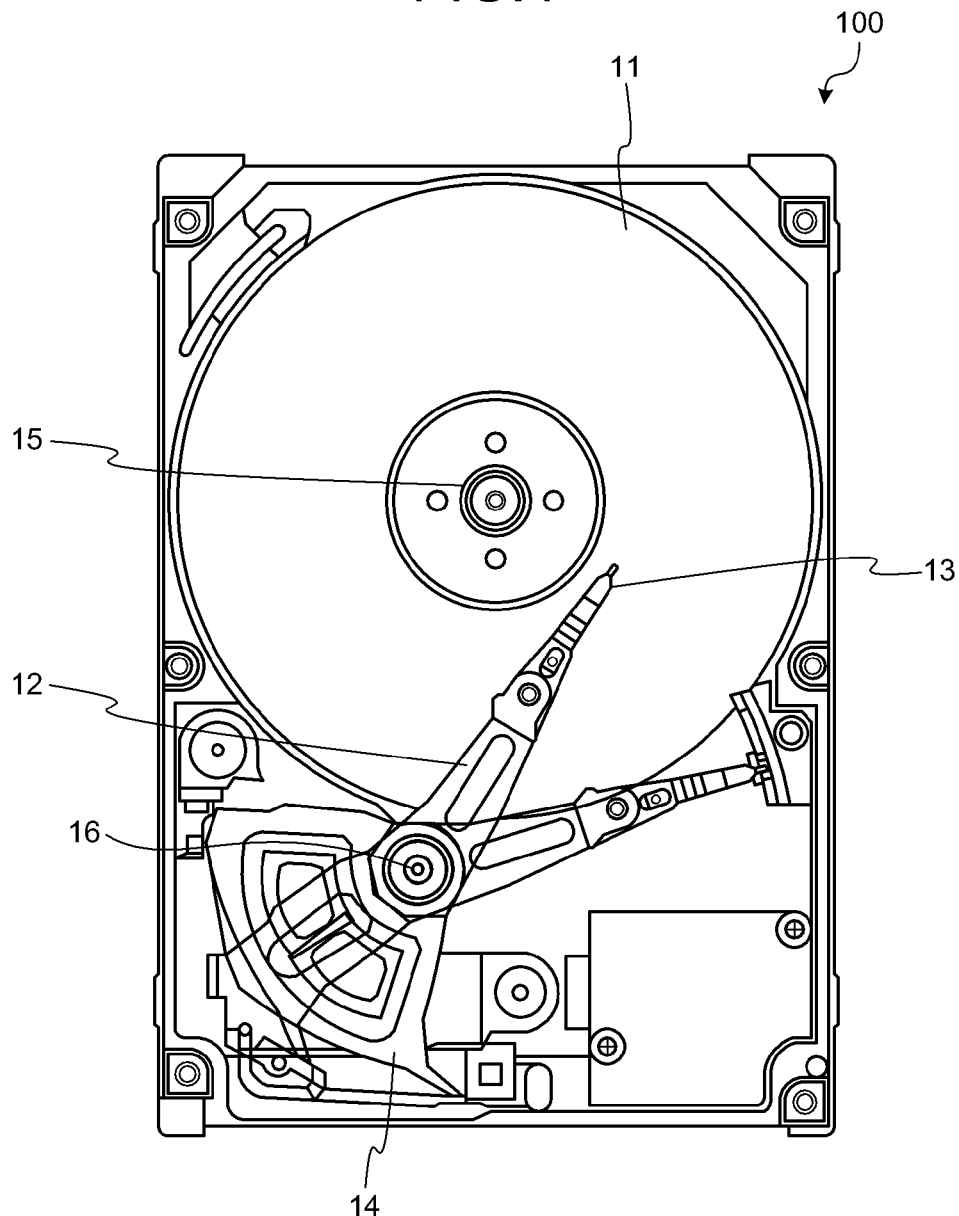
FIG. 1 is a cross-section of a magnetic recording device according to a first embodiment.

An outline of a magnetic recording device 100 according to the first embodiment is explained. FIG. 1 is a cross-section of the magnetic recording device 100 according to the first embodiment. As illustrated in FIG. 1, the magnetic recording device 100 includes a magnetic recording medium 11, and an arm 12. The magnetic recording medium 11 is rotationary driven by a spindle motor (hereinafter "SPM") 15.

The magnetic recording medium 11 according to the first embodiment is a patterned medium that records various information, and includes a data region that stores thereon user data and a servo region that stores thereon servo information and the like. The servo information is data that is used for positioning control of a head 13. The servo region of the magnetic recording medium 11 according to the first embodiment is formed by an arrangement pattern (called as a "servo pattern") of a magnetic material.

Read and write from and on the magnetic recording medium 11 is performed by using the head 13 that is provided at one end of the arm 12, which is a head supporting mechanism. By aerodynamic lift force that is produced by the rotation of the magnetic recording medium 11, the head 13 performs read and write while maintaining a slightly floating state above a surface of the magnetic recording medium 11. By driving a voice-coil motor (hereinafter "VCM") 14 that is a head drive mechanism provided at the other end of the arm 12, the arm 12 swings on a circular arc centering on an axis 16. The head 13 moves to seek a track in a track traversing direction of the magnetic recording medium 11 and changes the target track to read and write.

Figure 2:
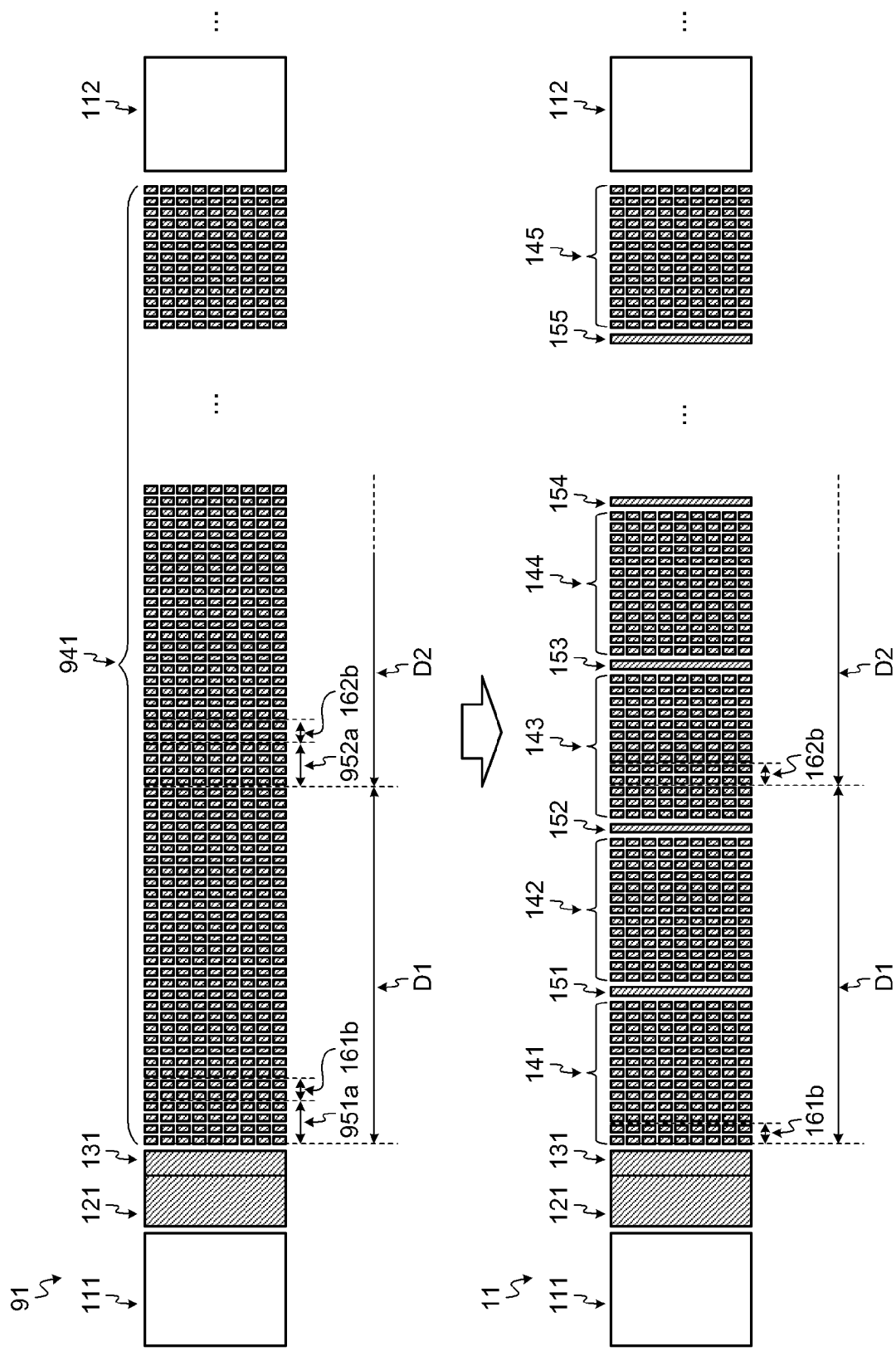
FIG. 2 is a diagram illustrating a configuration of a magnetic recording medium according to a comparative example, and a configuration of a magnetic recording medium according to the first embodiment.

Using FIG. 2, the configuration of the magnetic recording medium 11 is explained. FIG. 2 is a diagram illustrating a configuration of a magnetic recording medium 91 of a comparative example and a configuration of the magnetic recording medium 11 according to the first embodiment. In FIG. 2, a part of the magnetic recording medium, which is included in the magnetic recording device, is illustrated. Specifically, an upper half portion of FIG. 2 illustrates a part of the magnetic recording medium 91 of the comparative example, and a lower half portion of FIG. 2 illustrates a part of the magnetic recording medium 11 according to the first embodiment. In FIG. 2, a lateral direction indicates a circumferential direction (a track direction) of the magnetic recording medium, and a vertical direction indicates a radial direction (called as "a cross-track direction" or also called as "a track-width direction") of the magnetic recording medium.

As illustrated in the upper half portion of FIG. 2, the magnetic recording medium 91 includes a servo region 111, a preamble 121, a Sync mark 131, and a data region 941. The magnetic recording medium 91 further includes a preamble, Sync mark, and data region in sequence in regions following a servo region 112.

The servo region 111 includes an address part from which the reproduction signal that indicates track numbers and sector numbers in the magnetic recording medium 91 are read out, and a burst part from which the reproduction signal for positioning the head 13 to the center of the track is read out.

The preamble 121 is a region where a magnetic material is arranged in a predetermined pattern so that a reproduction signal of a constant frequency is read out. The Sync mark 131 is a region where the magnetic material is arranged so that a reproduction signal that indicates a start of the data region 941 is read out.

An exemplary comparative magnetic recording device generates the write clock and adjusts the phase based on the reproduction signal that is read out from the preamble 121. Furthermore, based on the reproduction signal read out from the preamble 121, the exemplary comparative magnetic recording device calculates a gain for making constant the amplitudes of the reproduction signals read out from the preamble 121 and the Sync mark 131.

Hereinafter, a preamble that is used for generating the write clock is called as a "write-synchronization preamble". Moreover, the reproduction signal read out from the write-synchronization preamble is called as a "write-reproduction signal". The gain for making constant the amplitude of the reproduction signal read out from the preamble 121 and the Sync mark 131 is called as a "write-reproduction-signal gain".

The data region 941 is a region where the user data and the like are recorded, and magnetic particles are arranged in a circumferential direction and in a radial direction so as to be isolated each other with a non-magnetic material. The data region 941 includes the preamble and Sync mark for every data sector (for example, 512 bytes) that is a minimum recording unit. In the example illustrated in the upper half portion of FIG. 2, the data region 941 includes a preamble 951$a$, and a Sync mark 161$b$ at a head of the data sector D1. The data region 941 includes a preamble 952$a$, and a Sync mark 162$b$ at a head of the data sector D2.

The preambles 951$a$ and 952$a$ are regions where the magnetic particles are magnetized with a predetermined pattern. The Sync marks 161$b$ and 162$b$ are regions where the magnetic particles are magnetized so that the reproduction signal that indicates the start of the user data storage region is read out.

The exemplary comparative magnetic recording device generates the read clock and adjusts the phase based on the reproduction signal read out from the preamble 951$a$ or 952$a$. Furthermore, the exemplary comparative magnetic recording device calculates the gain for making constant the amplitude of the reproduction signal read out from the data region based on the reproduction signal read out from the preamble 951$a$ or 952$a$.

Hereinafter, a preamble that is used for generating the read clock and the like is called as a "read-synchronization preamble". Moreover, the reproduction signal read out from the read-synchronization preamble is called as a "read-reproduction signal". The reproduction signal read out from the data region is called as a "data-reproduction signal". The gain for making constant the amplitude of the data-reproduction signal is called as a "data-reproduction-signal gain".

As described above, the magnetic recording medium 91 includes the write-synchronization preamble 121 for generating the write clock and the like. The magnetic recording medium 91 also includes the read-synchronization preamble 951$a$ and 952$a$ for generating the read clock and the like. This invites a problem that the capacity for storing the user data and the like is reduced. Particularly, the fact that the read-synchronization preambles 951$a$ and 952$a$ are provided for every data sector becomes a factor leading to large reduction of the storage capacity of the magnetic recording medium 91.

The magnetic recording device 100 according to the first embodiment uses the magnetic recording medium 11 which is not provided with the read-synchronization preamble. Specifically, as illustrated in the lower half portion of FIG. 2, the magnetic recording medium 11 is not provided with the read-synchronization preamble at the head of the data sector D1. As a result, the magnetic recording device 100 may store the user data and the like at regions excluding the Sync mark 161b in the data sector D1. Similarly, the data sector D2 does not have the read-synchronization preamble. Thus, the magnetic recording device 100 may store the user data and the like at regions excluding the Sync mark 162b in the data sector D2.

The magnetic recording medium 11 is provided with Resync marks at predetermined intervals in the data region. According to an example illustrated in FIG. 2, the magnetic recording medium 11 is provided with a Resync mark 151 posterior to a data region 141, and with a Resync mark 152 posterior to the data region 142. Thus, the magnetic recording medium 11 is alternately provided with data regions 141 to 145 and Resync marks 151 to 155. The Resync marks 151 to 155 are described later in detail.

Like the exemplary comparative magnetic recording device, the magnetic recording device 100 that includes the magnetic recording medium 11 generates the write clock and adjusts the phase based on the write-reproduction signal read out from the write-synchronization preamble 121, and calculates the write-reproduction-signal gain. However, in the magnetic recording device 100, the magnetic recording medium 11 is not provided with the read-synchronization preamble, therefore it may not be possible to generate the read clock and calculate the data-reproduction-signal gain based on the read signal that is read out from the read-synchronization preamble.

The magnetic recording device 100 according to the first embodiment generates the read clock by correcting the write clock. Moreover, the magnetic recording device 100 according to the first embodiment generates the data-reproduction-signal gain by correcting the write-reproduction-signal gain. To generate the read clock and the data-reproduction-signal gain, for example, at an inspection before shipment of the magnetic recording device 100, the magnetic recording device 100 calculates a predetermined correction value, and stores the calculated correction value in a predetermined storage unit.

Figure 3:
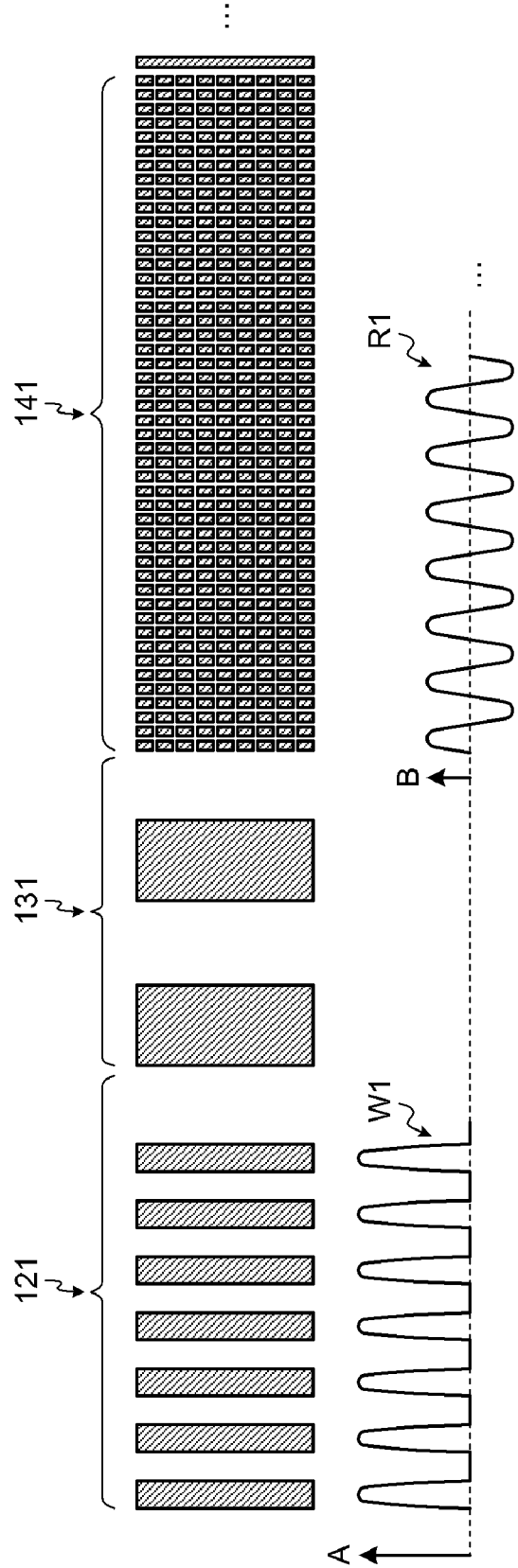
FIG. 3 is a diagram for explaining a correction-value-calculation process performed by the magnetic recording device.

Using FIG. 3, the above-described correction-value-calculation process is explained in detail. FIG. 3 is a diagram for explaining the correction-value-calculation process performed by the magnetic recording device 100. First, the magnetic recording device 100, at the time of, for example, inspection before the shipment, generates the write clock based on a write-reproduction signal W1 that is read out from the write-synchronization preamble 121 illustrated in FIG. 3.

Subsequently, the magnetic recording device 100 records a predetermined data pattern on the data region 141 using the generated write clock. The predetermined data pattern described here is, for example, such a data pattern that is recorded on the above-described read-synchronization preamble 951a. Specifically, at the time of inspection, the magnetic recording device 100 temporarily records the predetermined data on the data region 141. An example in which the data is recorded on the data region 141 is described herein; however, in the magnetic recording device 100, the data may be recorded on the data regions 142 and the like other than the data region 141.

Subsequently, the magnetic recording device 100 reads out the data from the magnetic recording medium 11. Then, the magnetic recording device 100 measures the amplitude of the write-reproduction signal W1 read out from the write-synchronization preamble 121, and the amplitude of the read-reproduction signal R1 read out from the data region 141. In an example illustrated in FIG. 3, the magnetic recording device 100 measures "A" as the amplitude of the write-reproduction signal W1, and "B" as the amplitude of the read-reproduction signal R1.

Subsequently, the magnetic recording device 100 calculates a relational expression between the amplitude of the write-reproduction signal W1 and the amplitude of the read-reproduction signal R1. In an example illustrated in FIG. 3, the relational expression is expressed by an expression such as B=f(A). For example, when the amplitude "A" of the write-reproduction signal W1 is "10", and when the amplitude "B" of the read-reproduction signal R1 is "5", the relational expression f is "0.5". The magnetic recording device 100 stores the calculated relational expression f (in the above-described case, "0.5") in a predetermined storage unit. In the present specification, the value indicated by the relational expression f is to be called as a "gain-correction value".

The magnetic recording device 100 generates the write clock based on the write-reproduction signal W1. Then, the magnetic recording device 100 calculates a phase difference between the generated write clock and the read-reproduction signal R1. For example, the magnetic recording device 100 calculates a phase difference that is calculated by subtracting the phase of the read-reproduction signal R1 from the phase of the write clock. The magnetic recording device 100 stores the calculated phase difference in a predetermined storage unit. In the present specification, such a phase difference is to be called as a "phase-correction value".

In this manner, at the time of, for example, inspection before the shipment of the magnetic recording device 100, the magnetic recording device 100 calculates the gain-correction value and phase-correction value and stores the calculated gain-correction value and phase-correction value in a predetermined storage unit. Subsequently, after storing the calculated gain-correction value and phase-correction value in the predetermined storage unit, the magnetic recording device 100 deletes a predetermined data recorded on the data region 141. Thus, the magnetic recording device 100 may use the region, where the data is temporarily recorded on the data region 141, as a region for storing the user data and the like.

When the magnetic recording device 100 performs a read process at a time of operation after the shipment thereof, the magnetic recording device 100 generates the write clock based on the write-reproduction signal read out from the write-synchronization preamble 121. Specifically, upon detecting the write-reproduction signal read out from the write-synchronization preamble 121, the magnetic recording device 100 generates the clock and starts a PLL (Phase locked loop) synchronization. The PLL synchronization indicates detecting a phase difference between an output signal (comparison signal) and input signal (write-reproduction signal), and transmitting a signal of synchronized frequency as the write clock.

Based on the phase-correction value stored in the predetermined storage unit, the magnetic recording device 100 generates the read clock from the write clock. For example, by adding or subtracting the phase-correction value to or from the phase of the write clock, the magnetic recording device 100 generates the clock that coincides with the phase of the read-reproduction signal R1 that is measured at the time of inspection before the shipment of the magnetic recording device 100. The generated clock corresponds to the read clock.

Thus, even though the magnetic recording device 100 is not provided with the read-synchronization preamble for every data sector, the magnetic recording device 100 may generate a read clock whose phase is the same as the phase of the read clock that is generated based on the read-reproduction signal.

When the magnetic recording device 100 performs a read process at a time of operation after the shipment thereof, the magnetic recording device 100 calculates the write-reproduction-signal gain based on the write-reproduction signal. Subsequently, the magnetic recording device 100 corrects the calculated write-reproduction-signal gain based on the gain-correction value stored in the predetermined storage unit, and then the magnetic recording device 100 generates the data-reproduction-signal gain. For example, the magnetic recording device 100 generates the data-reproduction-signal gain by multiplying the write-reproduction-signal gain by the gain-correction value.

Then, the magnetic recording device 100 amplifies the data-reproduction signal, which is read out from the data region 141 and the like by the head 13, in accordance with the above-described calculated data-reproduction-signal gain. Then the magnetic recording device 100 obtains the user data and the like from the amplified data-reproduction signal using the above-described generated read clock.

Thus, even though the magnetic recording device 100 is not provided with the read-synchronization preamble for every data sector, the magnetic recording device 100 may calculate the data-reproduction-signal gain that is suitable for the data-reproduction signal.

When the magnetic recording device 100 detects the reproduction signal read out from the Sync mark 131, the magnetic recording device 100 calculates a predictive position where a next Resync mark is arranged. Hereinafter, the predictive position, where the next Resync mark is arranged, is to be called as a "Resync predictive position".

When the magnetic recording device 100 detects the reproduction signal read out from the Sync mark that is a pattern of one or more pulses, the magnetic recording device 100 compares the timing of the above-described calculated Resync predictive position with the timing that has detected the Resync mark, and then the magnetic recording device 100 obtains the phase difference. Then the magnetic recording device 100 corrects the phase of the write clock based on the above-obtained phase difference. Then, based on the phase-correction value stored in the predetermined storage unit, the magnetic recording device 100 further corrects the phase of the above-corrected write clock and then generates the read clock. Then the magnetic recording device 100 obtains the user data and the like from the data-reproduction signal using the generated read clock.

Thus, even when the phase of the read clock gradually shifts, the magnetic recording device 100 may periodically correct the phase of the read clock every time the magnetic recording device 100 reads out the signal from the Resync mark that is arranged at predetermined intervals.

As described above, the magnetic recording device 100 according to the first embodiment uses the magnetic recording medium 11 that is not provided with the read-synchronization preamble; therefore the magnetic recording device 100 may increase the capacity for storing the data.

The magnetic recording device 100 calculates the phase-correction value in advance. Therefore, even though the magnetic recording device 100 is not provided with the read-synchronization preamble for every data sector, the magnetic recording device 100 may generate the read clock whose phase is the same as the phase of the read clock that is generated based on the read-reproduction signal. Thus, the magnetic recording device 100 may perform the read process at an accurate timing.

The magnetic recording device 100 calculates the gain-correction value in advance. Therefore, even though the magnetic recording device 100 is not provided with the read-synchronization preamble for every data sector, the magnetic recording device 100 may calculate the data-reproduction-signal gain that is suitable for the data-reproduction signal.

For the above-described reasons, the magnetic recording device 100 may perform the read process at an accurate timing and increase the capacity for storing the data.

Figure 4:
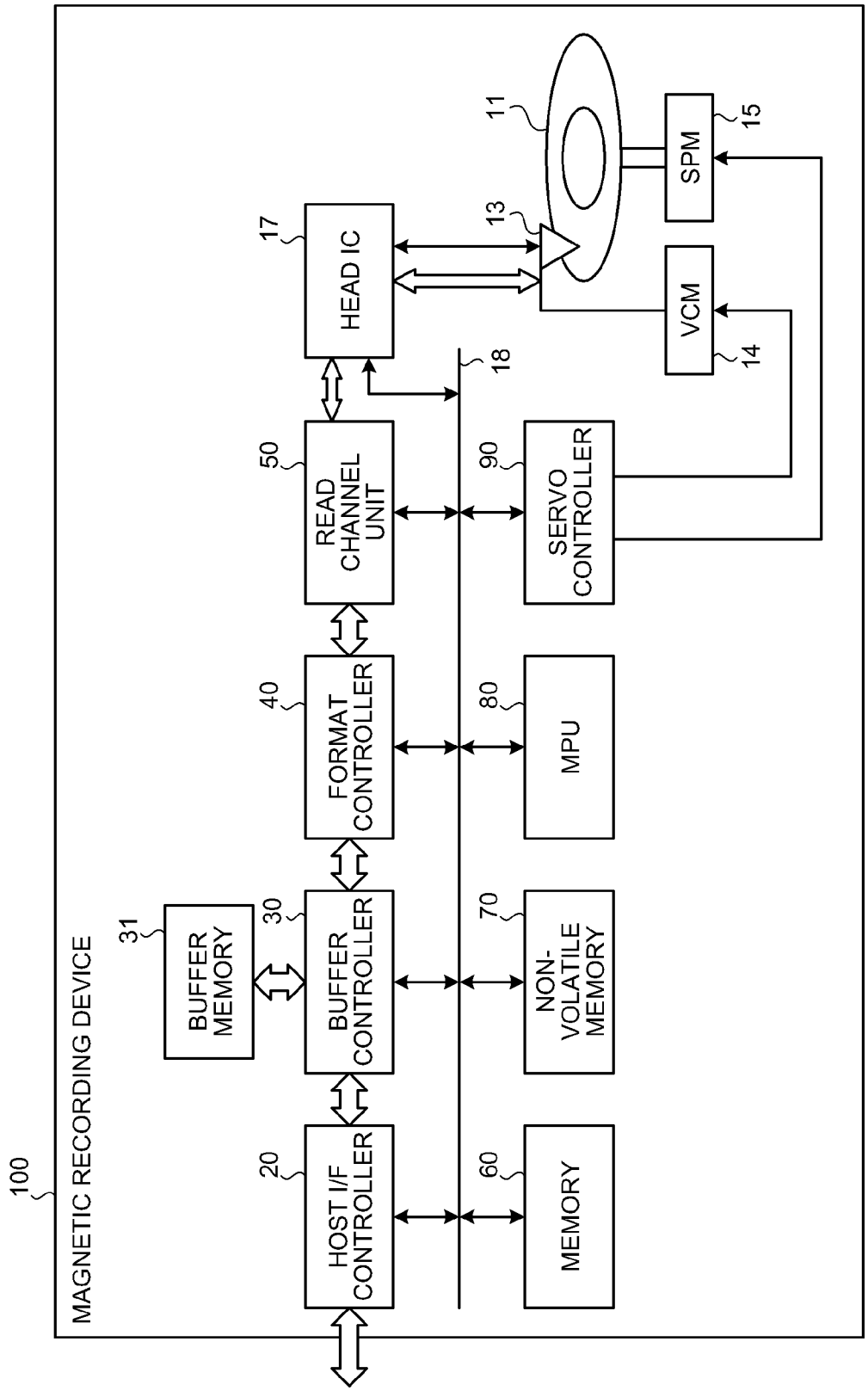
FIG. 4 is a diagram illustrating a general configuration of the magnetic recording device according to the first embodiment.

Next, configuration of the magnetic recording device 100 according to the first embodiment is explained. FIG. 4 is a diagram illustrating a general configuration of the magnetic recording device 100 according to the first embodiment. As illustrated in FIG. 4, the magnetic recording device 100 includes: a host interface controller (hereinafter abbreviated as "host I/F controller") 20; a buffer controller 30; a buffer memory 31, a format controller 40, a read channel unit (hereinafter "RDC") 50; a memory 60; a non-volatile memory 70; an MPU (Micro Processing Unit) 80; a servo controller 90; the magnetic recording medium 11; the head 13; the VCM 14; the SPM 15; a head IC 17; and a common bus 18.

The host I/F controller 20 is connected to a host that is a higher-level device of the magnetic recording device 100, and controls communication between the magnetic recording device 100 and the host. The buffer controller 30 controls the buffer memory 31. The buffer memory 31 temporarily stores therein information and the like that are communicated between the host and the magnetic recording device 100.

The format controller 40 controls reading-out of the data, and for example, performs error check of the data that is read-out. When reading-out the data, the RDC 50 amplifies a data signal that is output from the head IC 17, and performs predetermined processes such as AD conversion and demodulation. The head IC 17 includes a not-illustrated preamplifier, and preamplifies the data signal that is read out by the head 13 when the data is being read out.

The memory 60 and the non-volatile memory 70 store therein a predetermined control program (firmware program) which is executed at the MPU 80 and various control data. The MPU 80 performs main control of the magnetic recording device 100 with the firmware program. In other words, the MPU 80 decodes the command received from the host and controls each of the process units, and integratedly controls read and write of the data from and on the magnetic recording medium 11. The MPU 80 may be MCU (Micro Controller Unit) or CPU (Central Processing Unit).

The servo controller 90 drives motors for the VCM 14 and the SPM 15 while confirming the operational statuses of the VCM 14 and the SPM 15. The common bus 18 connects each of the process units in the magnetic recording device 100, and performs transmittion and receipt of various kinds of information among the process units.

Figure 5:
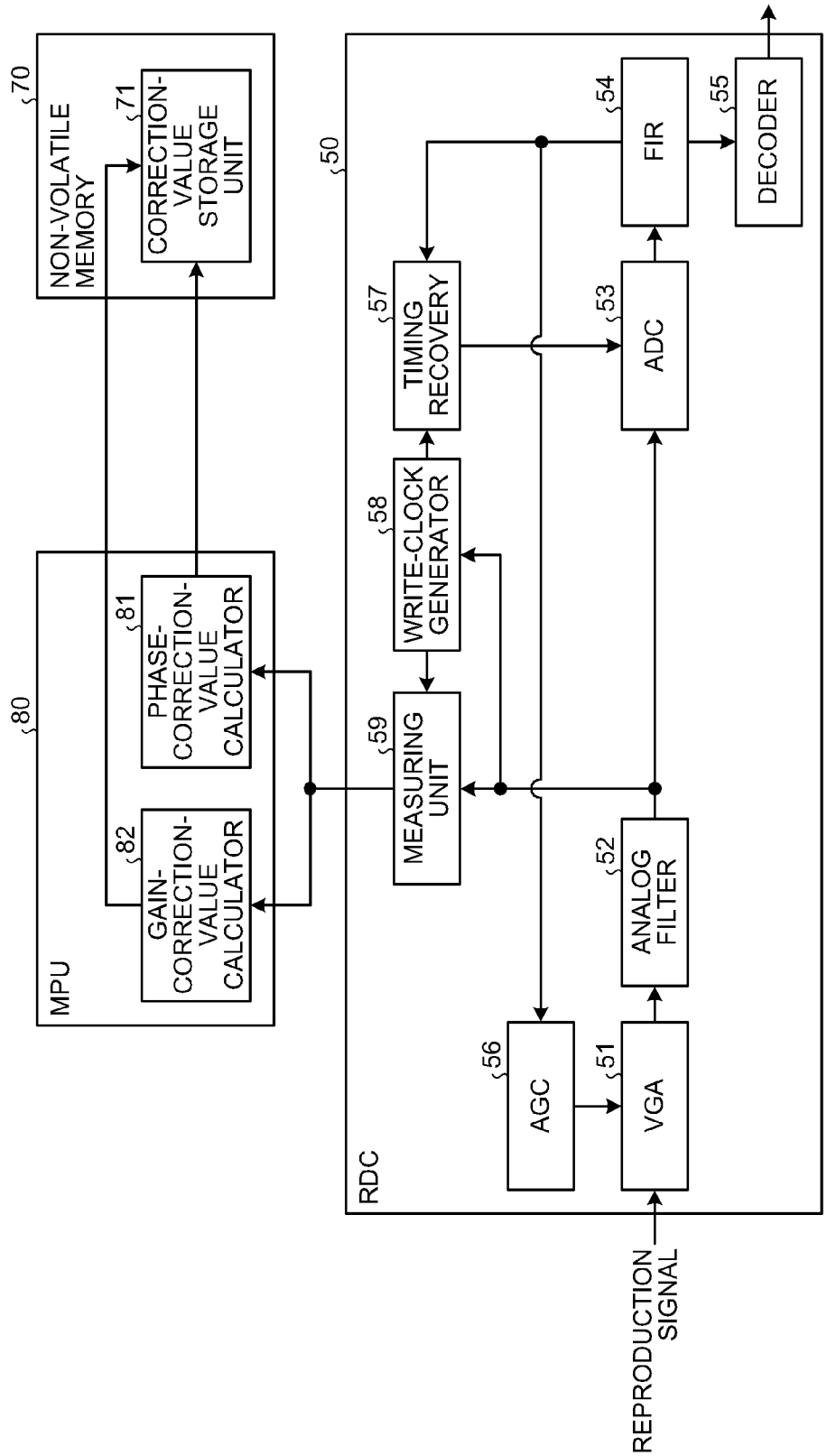
FIG. 5 is a diagram illustrating a configuration of a main section which performs the correction-value-calculation process in the magnetic recording device.

Next, configuration of the main section of the magnetic recording device 100 according to the first embodiment is explained. In the following explanations, the configuration of the main section of the magnetic recording device 100 that performs the correction-value-calculation process and the configuration of the main section of the magnetic recording device 100 that performs the read process are separately explained. FIG. 5 is a diagram illustrating a configuration of a main section of the magnetic recording device 100 which performs the correction-value-calculation process.

As illustrated in FIG. 5, the RDC 50 of the magnetic recording device 100 includes: a VGA (Variable Gain Amplifier) 51; an analog filter 52; an ADC (Analog Digital Converter) 53; an FIR (Finite Impulse Response) 54; a decoder 55; an AGC (Auto Gain Control) 56; a timing recovery 57; a write-clock generator 58; and a measuring unit 59.

The VGA 51 is an amplifier that adjusts the gain of the amplitude (signal level) of the reproduction signal that is read out from the magnetic recording medium 11 by the head 13. Specifically, in accordance with the gain that is input from the AGC 56, the VGA 51 amplifies the reproduction signal so that the amplitude of the amplified reproduction signal becomes constant.

The analog filter 52 is, for example, an LPF (Low-Pass Filter). Among signals input from the VGA 51, the analog filter 52 removes high-frequency-signal components and passes low-frequency-signal components. The ADC 53 converts the analog signal, whose high-frequency-signal components are removed by the analog filter 52, into the digital signal. The ADC 53 converts the analog signal into the digital signal based on the read clock (sampling clock) that is input from the timing recovery 57 that is explained later.

The FIR 54 performs filtering of the digital signal which is AD converted by the ADC 53, and waveform-equalizes the digital signal. From the signal that is waveform-equalized by the FIR 54, the decoder 55 detects the data that is recorded by using a Viterbi decoding method. Based on the signal that is input from the FIR 54, the AGC 56 controls the gain which is output to the VGA 51. The timing recovery 57 outputs the read clock (sampling clock) to the ADC 53. Meanwhile, processes performed by the AGC 56 and by the timing recovery 57 are described later in detail using FIG. 6, because these processes are not closely related to the correction-value-calculation process performed by the magnetic recording device 100.

When the reproduction signal is input from the analog filter 52, and the write-clock generator 58 detects the write-reproduction signal, the write-clock generator 58 generates the write clock. Then the write-clock generator 58 outputs the generated write clock to the measuring unit 59.

The measuring unit 59 performs sampling of the write-reproduction signal that is input from the analog filter 52, and measures the amplitude of the write-reproduction signal. The measuring unit 59 performs sampling of the read-reproduction signal that is input from the analog filter 52, and measures the amplitude of the read-reproduction signal. Then, the measuring unit 59 outputs the measured amplitude value of the write-reproduction signal and amplitude value of the read-reproduction signal to the MPU 80 (a gain-correction-value calculator 82 which is described later).

The measuring unit 59 measures the phase of the read-reproduction signal that is input from the analog filter 52. The measuring unit 59 measures the phase of the write clock that is input from the write-clock generator 58. Then, the measuring unit 59 outputs the measured phase of the read-reproduction signal and phase of the write clock to the MPU 80 (a phase-correction-value calculator 81 that is described later).

The non-volatile memory 70 includes a correction-value storage unit 71. The correction-value storage unit 71 stores therein the gain-correction value and the phase-correction value. The correction-value storage unit 71 is made to store therein the phase-correction value and the gain-correction value by the phase-correction-value calculator 81 and the gain-correction-value calculator 82, which are described later.

The MPU 80 includes the phase-correction-value calculator 81 and the gain-correction-value calculator 82. The phase-correction-value calculator 81 calculates the phase-correction value. Specifically, the phase-correction-value calculator 81 calculates the phase-correction value that is the phase difference between the phase of the read-reproduction-signal, which is input from the measuring unit 59, and the phase of the write clock. Then, the phase-correction-value calculator 81 stores the calculated phase-correction value in the correction-value storage unit 71.

The gain-correction-value calculator 82 calculates the gain-correction value. Specifically, the gain-correction-value calculator 82 calculates the gain-correction value based on the amplitude value of the write-reproduction signal input from the measuring unit 59 and the amplitude value of the read-reproduction signal. Then, the gain-correction-value calculator 82 stores the calculated gain-correction value in the correction-value storage unit 71.

Figure 6:
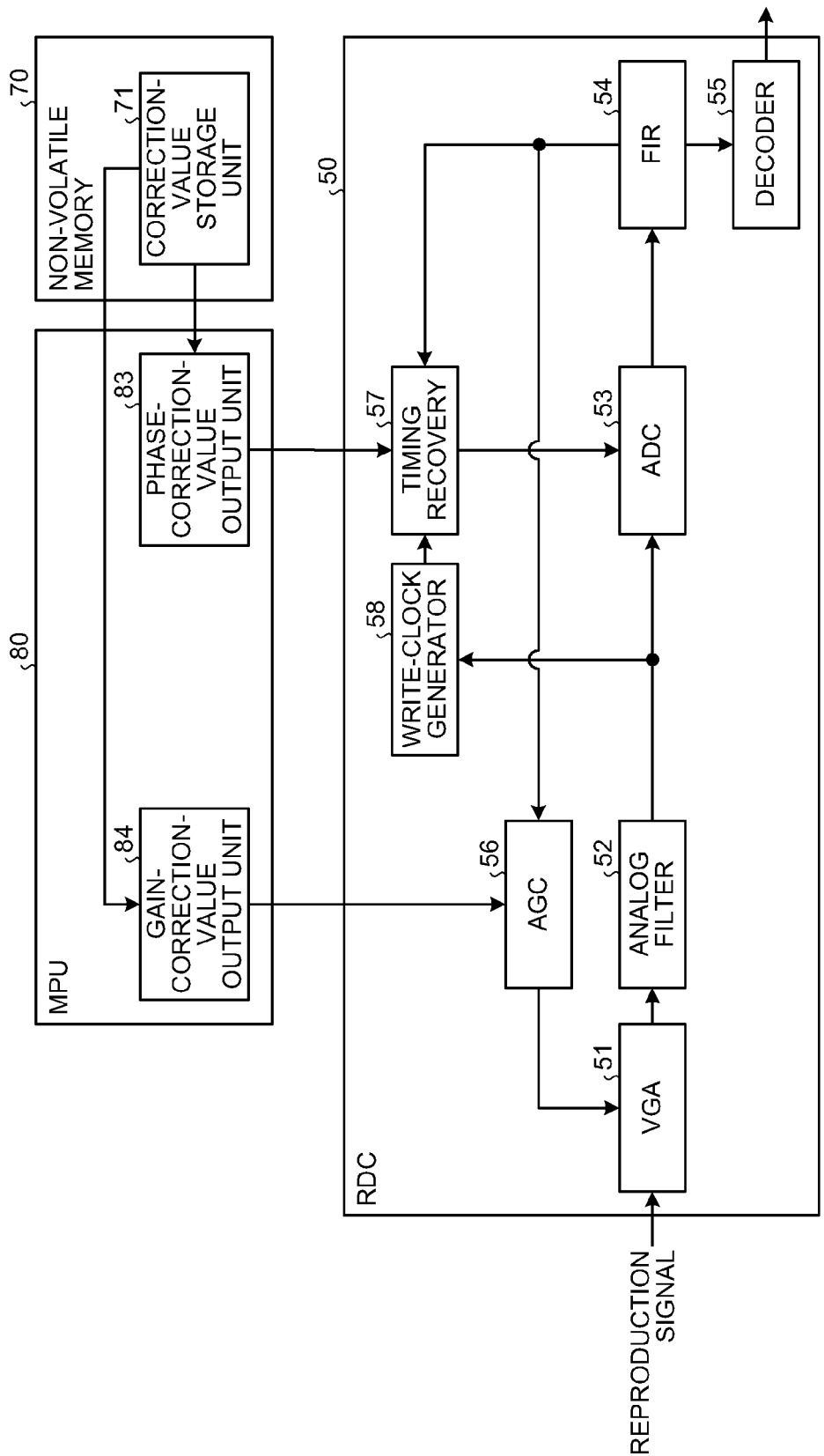
FIG. 6 is a diagram illustrating a configuration of a main section which performs a read process in the magnetic recording device.

Next, configuration of the main section which performs the read process in the magnetic recording device 100 is explained. FIG. 6 is a diagram illustrating a configuration of a main section which performs a read process in the magnetic recording device 100. Here, the same reference numerals are given to components having similar functions to those illustrated in FIG. 5, and therefore detailed explanations thereof are omitted.

As illustrated in FIG. 6, the MPU 80 in the magnetic recording device 100 includes a phase-correction-value output unit 83, and a gain-correction-value output unit 84. The phase-correction-value output unit 83 outputs the phase-correction value to the timing recovery 57. Specifically, when the read process is performed by the magnetic recording device 100, the phase-correction-value output unit 83 outputs the phase-correction value, which is stored in the correction-value storage unit 71, to the timing recovery 57.

Using the phase-correction value input from the phase-correction-value output unit 83, the timing recovery 57 corrects the phase of the write clock that is generated by the write-clock generator 58. For example, the timing recovery 57 generates the read clock that is a clock obtained by adding or subtracting the phase-correction value to or from the phase of the write clock. Then, the timing recovery 57 outputs the generated read clock to the ADC 53.

Every time the write-clock generator 58 detects the Resync mark, the write-clock generator 58 corrects the phase of the write clock and outputs the phase-corrected write clock to the timing recovery 57. Every time the write clock is input from the write-clock generator 58, the timing recovery 57 corrects the phase of the write clock by the phase-correction value, and generates the read clock. Then, the timing recovery 57 outputs the generated read clock to the ADC 53.

The gain-correction-value output unit 84 outputs the gain-correction value, which is stored in the correction-value storage unit 71, to the AGC 56. Specifically, when the magnetic recording device 100 performs the read process, the gain-correction-value output unit 84 outputs the gain correction value, which is stored in the correction-value storage unit 71, to the AGC 56.

The AGC 56 to which the gain-correction value is input corrects the write-reproduction-signal gain based on the gain-correction value, and generates the data-reproduction-signal gain. For example, the magnetic recording device 100 generates the data-reproduction-signal gain by multiplying the write-reproduction-signal gain by the gain-correction value. Then the AGC 56 outputs the generated data-reproduction-signal gain to the VGA 51. The VGA 51 amplifies the data-reproduction signal in accordance with the input data-reproduction-signal gain.

In FIG. 5 and FIG. 6 described above, for the convenience of explanation, the configuration of the main section which performs the correction-value-calculation process in the magnetic recording device 100 and the configuration of the main section which performs the read process in the magnetic recording device 100 are separately explained. However, in actual practice, the configuration of the main sections which perform the correction-value-calculation process and the read process in the magnetic recording device 100 may be the same. Specifically, the RDC 50 illustrated in FIG. 6 may include the measuring unit 59. The MPU 80 illustrated in FIGS. 5 and 6 may include all of the phase-correction-value calculator 81, the gain-correction-value calculator 82, the gain-correction-value output unit 84, and the phase-correction-value output unit 83.

Figure 7:
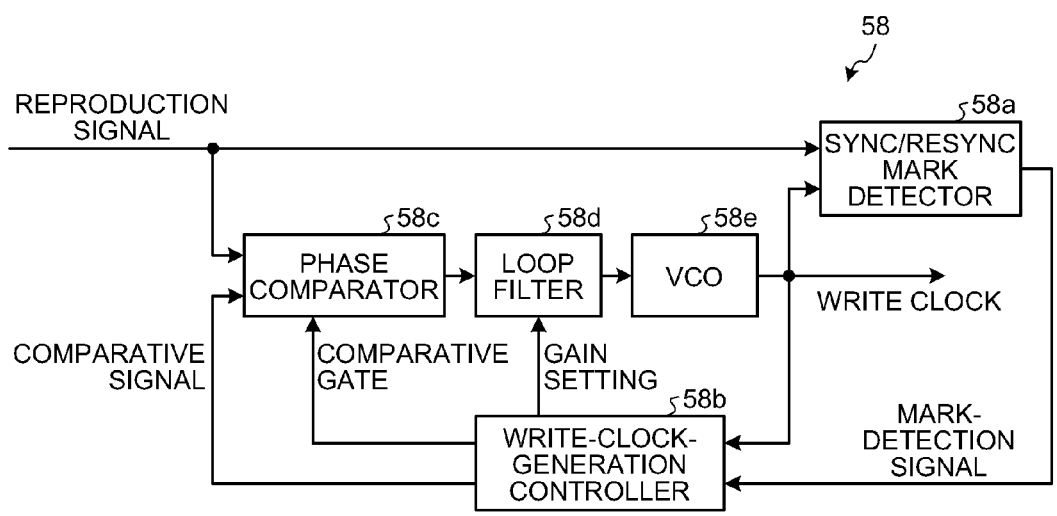
FIG. 7 is a diagram illustrating a configuration of a write-clock generator illustrated in FIGS. 5 and 6.

Next, configuration of the write-clock generator 58 illustrated in FIGS. 5 and 6 is explained. FIG. 7 is a diagram illustrating a configuration of the write-clock generator 58 illustrated in FIGS. 5 and 6. As illustrated in FIG. 7, the write-clock generator 58 includes: a Sync/Resync mark detector 58*a*; a write-clock-generation controller 58*b*; a phase comparator 58*c*; a loop filter 58*d*; and a VCO (Voltage Controlled Oscillator) 58*e*.

The Sync/Resync mark detector 58*a* detects the Sync mark and Resync mark. Specifically, the Sync/Resync mark detector 58*a* receives the reproduction signal from the head 13, upon detecting the Sync mark or Resync mark from the reproduction signal, the Sync/Resync mark detector 58*a* transmits a Sync-mark-detection signal or Resync-mark-detection signal to the write-clock-generation controller 58*b*.

The write-clock-generation controller 58*b* calculates the Resync predictive position and corrects the phase by the Resync mark. Specifically, upon receiving the Resync-mark-detection signal from the Sync/Resync mark detector 58*a*, the write-clock-generation controller 58*b* starts a process of calculating the next Resync mark predictive position. When the write-clock-generation controller 58*b* receives the Sync-mark-detection signal, the write-clock-generation controller 58*b* sends a gain switching request, for switching the PLL gain to a lower gain, to the loop filter 58*d* so that the Resync mark is detected.

The write-clock-generation controller 58*b* opens a comparative gate of the phase comparator 58*c*, which is described later, at the calculated Resync mark predictive position. At the same timing, the write-clock-generation controller 58*b* makes the phase comparator 58*c* compare the reproduction signal with a comparison signal and output the phase difference. Furthermore, upon receiving the Resync-mark-detection signal from the Sync/Resync mark detector 58*a*, the write-clock-generation controller 58*b* starts calculating the next Resync mark predictive position based on the write clock.

The phase comparator 58*c* outputs the phase difference between the two input signals. Specifically, the phase comparator 58*c* compares the reproduction signal received from the head 13 with the comparison signal received from the write-clock-generation controller 58*b*, and then the phase comparator 58*c* outputs the phase difference between the two signals to the loop filter.

The loop filter 58*d* converts the output phase difference into voltage. Specifically, the loop filter 58*d*: receives the phase difference from the phase comparator 58*c*; converts the received phase difference to voltage; suppresses the high frequency components by filtering with the low-pass filter; extracts the low frequency components of the electric signal; and outputs the extracted low frequency components of the electric signal to the VCO 58*e*.

The VCO 58*e* controls the frequency of the output voltage by the input voltage. Specifically, the VCO 58*e*: receives the voltage from the loop filter 58*d*; controls the frequency with the received voltage and generates the write clock; and outputs the generated write clock to the Sync/Resync mark detector 58*a* and the write-clock-generation controller 58*b*.

Figure 8:
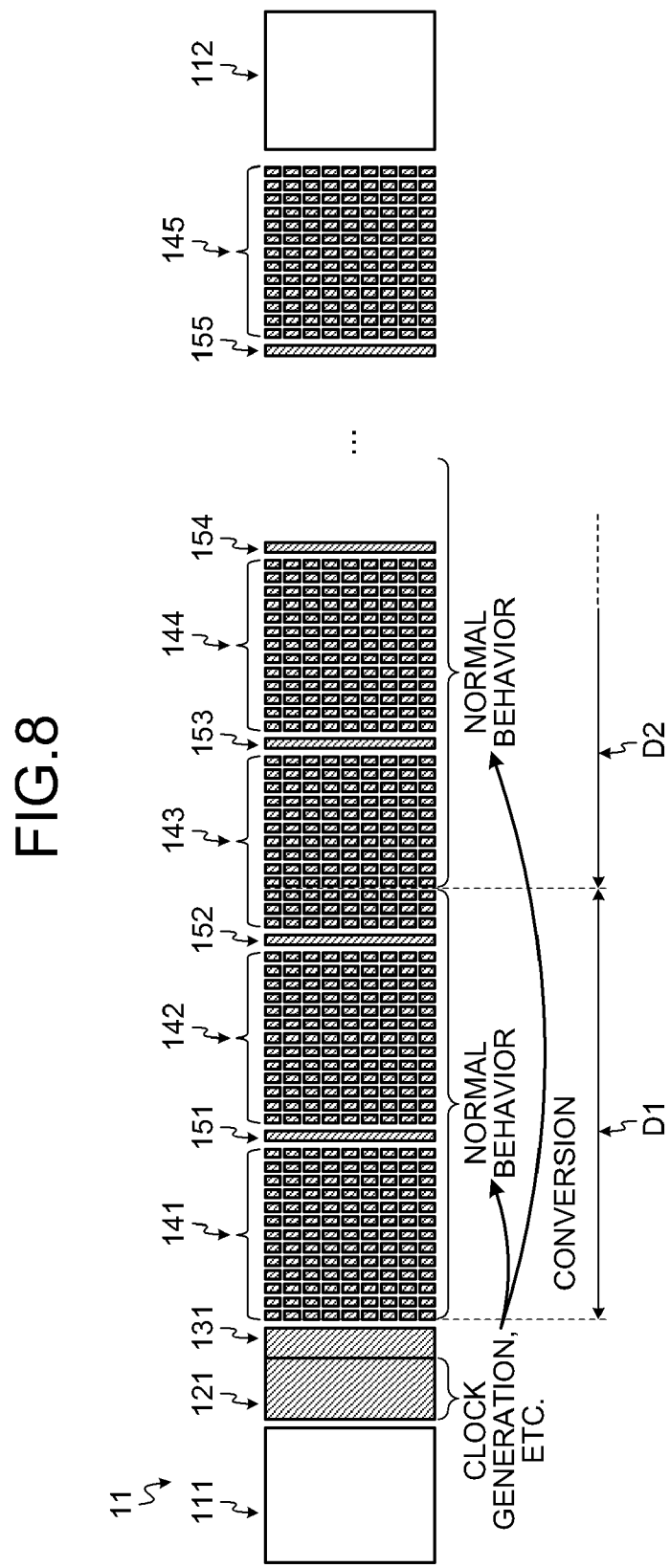
FIG. 8 is a diagram for explaining behavior, at a time of the read process, performed by the magnetic recording device according to the first embodiment.

Using FIG. 8, behavior at the time of read process by the magnetic recording device 100 is explained. FIG. 8 is a diagram for explaining the behavior by the magnetic recording device 100 at the time of the read process. As illustrated in FIG. 8, based on the write-reproduction signal read out from the write-synchronization preamble 121, the magnetic recording device 100 generates the write clock and calculates the write-reproduction-signal gain.

When the magnetic recording device 100 detects the Sync mark 131, the magnetic recording device 100 switches the gain to be used by the AGC 56, from the write-reproduction-signal gain to the data-reproduction-signal gain. Then, the magnetic recording device 100 generates the data-reproduction-signal gain by correcting the write-reproduction-signal gain using the gain-correction value. Furthermore, the magnetic recording device 100 generates the read clock by correcting the write clock using the phase-correction value.

The magnetic recording device 100 amplifies the data-reproduction signal read out from the data region 141 in accordance with the data-reproduction-signal gain, and obtains the data from the amplified data-reproduction signal using the above-described generated read clock.

Upon detecting the Resync mark 151, the magnetic recording device 100 corrects the phase of the write clock. Then, the magnetic recording device 100 corrects the phase of the phase-corrected write clock using the phase-correction value, and generates the read clock. Subsequently, using the generated read clock, the magnetic recording device 100 obtains data from the data-reproduction signal read out from the data region 142. In this manner, every time the magnetic recording device 100 detects the Resync mark, the magnetic recording device 100 generates a read clock anew, and obtains data from the data-reproduction signal.

Figure 9:
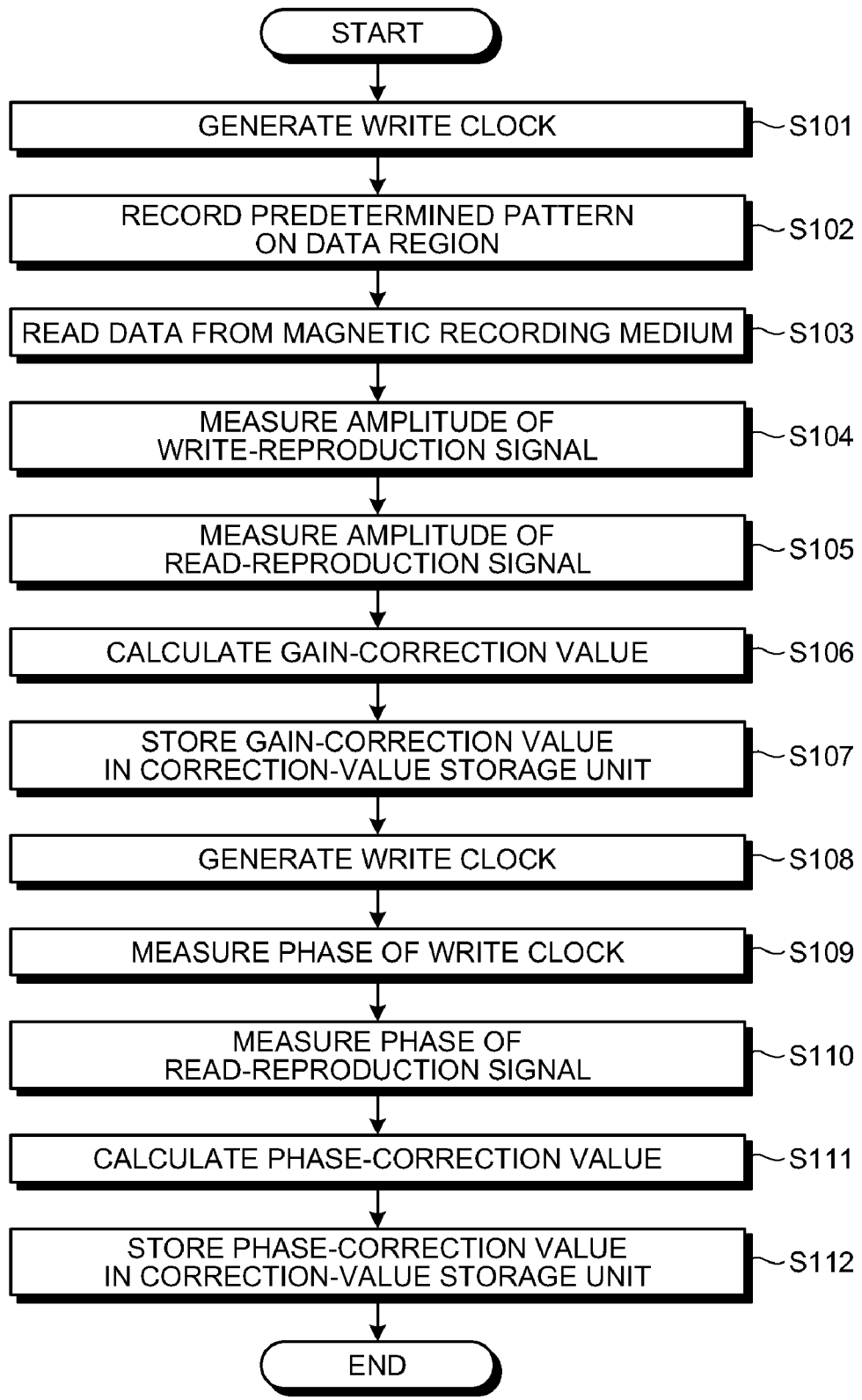
FIG. 9 is a flowchart illustrating a procedure of the correction-value-calculation process performed by the magnetic recording device according to the first embodiment.

Next, procedure of the correction-value-calculation process performed by the magnetic recording device 100 according to the first embodiment is explained. FIG. 9 is a flowchart illustrating the procedure of the correction-value-calculation process performed by the magnetic recording device 100 according to the first embodiment. When performing the correction-value-calculation process, first, based on the write-reproduction signal read out from the write-synchronization preamble 121, the write-clock generator 58 of the magnetic recording device 100 generates the write clock (step S101).

Then, using the generated write clock, the magnetic recording device 100 records a predetermined data pattern on the data region of the magnetic recording medium 11 (step S102). Such a recording process of the data pattern is performed by the head 13 in accordance with an instruction by the MPU 80. Then, the head 13 of the magnetic recording device 100 reads out the data from the magnetic recording medium 11 (step S103).

Then, among the reproduction signals read out by the head 13, the measuring unit 59 measures the amplitude of the write-reproduction signal (step S104). Moreover, the measuring unit 59 measures the amplitude of the read-reproduction signal read out by the head 13 (step S105).

Then, based on the amplitude value of the write-reproduction signal and the amplitude value of the read-reproduction signal measured by the measuring unit 59, the gain-correction-value calculator 82 of the MPU 80 calculates the gain-correction value (step S106). Then, the gain-correction-value calculator 82 stores the calculated gain-correction value in the correction-value storage unit 71 (step S107).

Then, based on the write-reproduction signal read out by the head 13, the write-clock generator 58 generates the write clock (step S108). Then, the measuring unit 59 measures the phase of the write clock generated by the write-clock generator 58 (step S109). Moreover, the measuring unit 59 measures the phase of the read-reproduction signal read out by the head 13 (step S110).

Then, the phase-correction-value calculator 81 of the MPU 80 calculates the phase-correction value which is the phase difference between the phase of the read-reproduction signal measured by the measuring unit 59 and the phase of the write clock (step S111). Then, the phase-correction-value calculator 81 stores the calculated phase-correction-value in the correction-value storage unit 71 (step S112).

Figure 10:
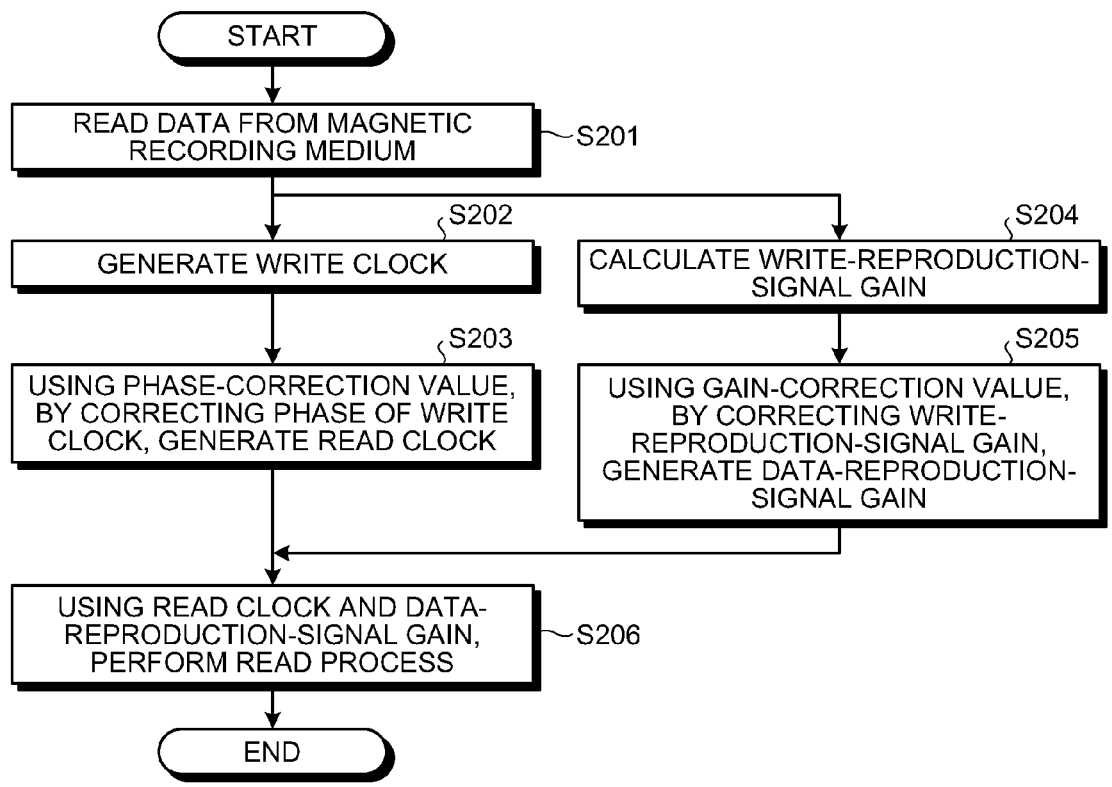
FIG. 10 is a flowchart illustrating a read process procedure by the magnetic recording device according to the first embodiment.

Next, read process procedure performed by the magnetic recording device 100 according to the first embodiment is explained. FIG. 10 is a flowchart illustrating the read process procedure performed by the magnetic recording device 100 according to the first embodiment. When performing the read process, first, the head 13 of the magnetic recording device 100 reads out the data from the magnetic recording medium 11 (step S201).

At this time, the phase-correction-value output unit 83 of the MPU 80 outputs the phase-correction value, which is stored in the correction-value storage unit 71, to the timing recovery 57. The gain-correction-value output unit 84 outputs the gain-correction value, which is stored in the correction-value storage unit 71, to the AGC 56.

Subsequently, based on the write-reproduction signal read out by the head 13, the write-clock generator 58 generates the write clock (step S202). By correcting the phase of the write clock input from the write-clock generator 58 using the phase-correction value, the timing recovery 57 generates the read clock (step S203).

Based on the write-reproduction signal read out by the head 13, the AGC 56 calculates the write-reproduction-signal gain (step S204). Then, by correcting the write-reproduction-signal gain using the gain-correction value, the AGC 56 generates the data-reproduction-signal gain (step S205).

Using the generated read clock and the data-reproduction-signal gain, the magnetic recording device 100 performs the read process (step S206). Specifically, the AGC 56 outputs the data-reproduction-signal gain to the VGA 51. Then, the VGA 51 amplifies the data-reproduction signal in accordance with the data-reproduction-signal gain. The timing recovery 57 outputs the read clock to the ADC 53. By performing sampling of the data-reproduction signal in accordance with the read clock, the ADC 53 performs AD conversion.

As described above, every time when the timing recovery 57 detects the Resync mark, the timing recovery 57 generates the read clock. By performing sampling of the data-reproduction signal in accordance with the read clock, the ADC 53 performs the AD conversion.

As described above, the magnetic recording device 100 according to the first embodiment uses the magnetic recording medium 11 which is not provided with the read-synchronization preamble. Therefore, it is possible to increase the capacity for storing the data.

The magnetic recording device 100 stores the phase-correction value and gain-correction value in the correction-value storage unit 71 at the time of inspection. As a result, even though the magnetic recording medium 11 is not provided with the read-synchronization preamble, the magnetic recording device 100 may generate the read clock which makes it possible to perform the read process at an accurate timing. Furthermore, the magnetic recording device 100 may calculate the data-reproduction-signal gain which is suitable for the data-reproduction signal.

Moreover, at the time of inspection, in accordance with the instruction of the MPU 80, the magnetic recording device 100 allows the head 13 to temporarily records a predetermined data on the data region, the magnetic recording device 100 calculates the phase-correction value and the gain-correction value using the predetermined data. In other words, even if the phase-correction value and the gain-correction value vary depending on the individual difference, the magnetic recording device 100 may calculate the phase-correction value and the gain-correction value which are suitable for each of the individuals. As a result, the magnetic recording device 100 may calculate the read clock and the data-reproduction-signal gain which are suitable for each of the individuals.

[b] Second Embodiment

In the above-described first embodiment, the read-synchronization preamble is not provided to the magnetic recording medium 11. However, the magnetic recording medium 11 may be provided with the read-synchronization preamble only at immediately posterior to the Sync mark. In the second embodiment, an example of a magnetic recording medium 21, which is provided with the read-synchronization preamble only at immediately posterior to the Sync mark, is explained.

In the following explanations, configuration of the magnetic recording medium 21 included in a magnetic recording device 200; behavior at the time of read process by the magnetic recording device 200; and a read process procedure by the magnetic recording device 200 are explained in sequence. Explanations of a cross-section, a general configuration, and a configuration of a main section of the magnetic recording device 200 are omitted because the explanations are similar to those of the, cross-section, general configuration, and configuration of the main section illustrated in FIGS. 1, 4, 5, and 6 respectively.

Figure 11:
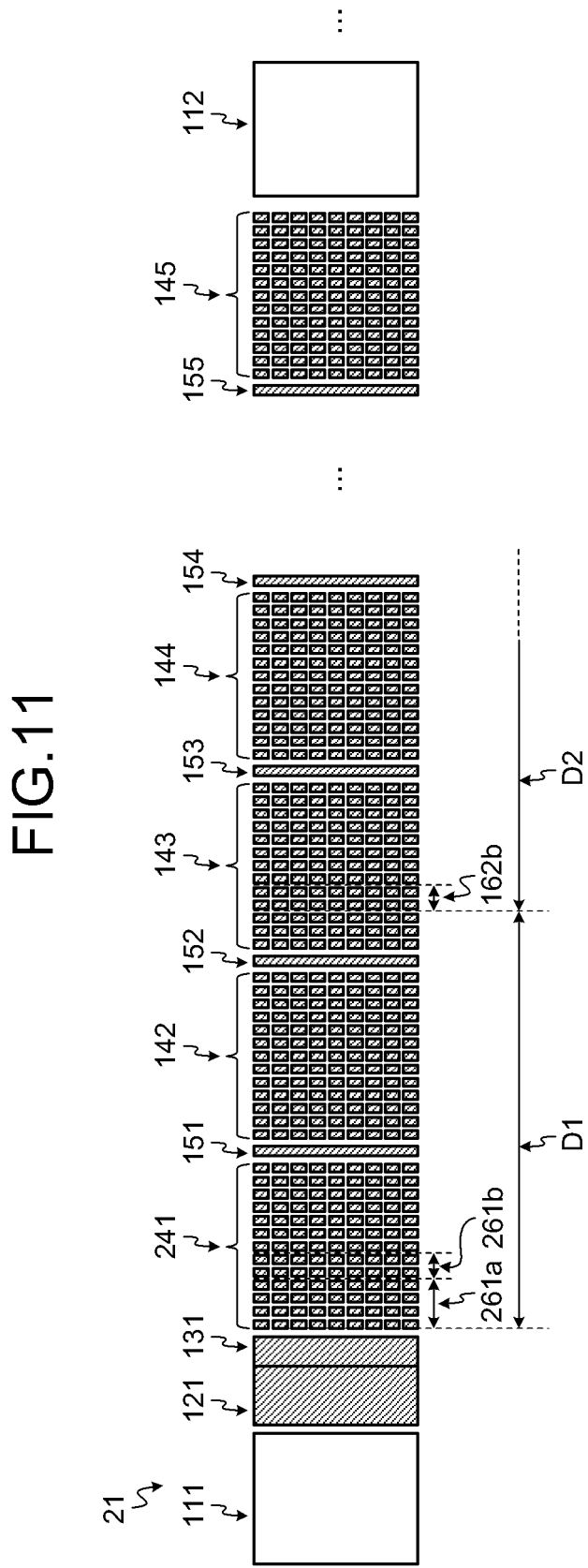
FIG. 11 is a diagram illustrating a configuration of a magnetic recording medium according to a second embodiment.

First, configuration of the magnetic recording medium 21 according to the second embodiment is explained. FIG. 11 is a diagram illustrating the configuration of the magnetic recording medium 21 according to the second embodiment. AS illustrated in FIG. 11, compared with the magnetic recording medium 11 illustrated in the lower half portion of FIG. 2, the magnetic recording medium 21 has a read-synchronization preamble 261a, posterior to the write-synchronization preamble 121 and the Sync mark 131.

The magnetic recording medium 21 does not have the read-synchronization preamble for each of the data sector, but the magnetic recording medium 21 has the read-synchronization preamble only posterior to the Sync mark 131. According to an example illustrated in FIG. 11, the magnetic recording medium 21 has the read-synchronization preamble at the head of a data sector D1; however, the magnetic recording medium 21 does not have the read-synchronization preamble at the head of a data sector D2. In regions posterior to the servo region 112, the magnetic recording medium 21 also has the read-synchronization preamble immediately posterior to the write-synchronization preamble and Sync marc.

When performing the read process, the magnetic recording device 200 according to the second embodiment calculates the data-reproduction-signal gain based on the read-reproduction signal read out from the read-synchronization preamble 261a. The magnetic recording device 200 generates the read clock by correcting the write clock using a similar method as explained in the first embodiment.

Reasons why the magnetic recording device 200 does not generate the read clock using the read-synchronization preamble is explained. When the read-synchronization preamble is provided at only immediately posterior to the Sync mark, the phase of the read clock is not corrected until the read-synchronization preamble is read out next time. In general, the phase of the clock gradually shifts; therefore, the phase of the clock is preferably corrected periodically. Therefore, the magnetic recording device 200 adopts a method of generating the read clock using the write clock whose phase is periodically corrected by the Resync mark 151 and the like.

On the other hand, the amplitude does not change rapidly; therefore, the magnetic recording device 200 generates the data-reproduction-signal gain based on the read-reproduction signal read out from the read-synchronization preamble.

As described above, the magnetic recording device 200 according to the second embodiment generates the data-reproduction-signal gain based on the read-synchronization preamble. As a result, the magnetic recording device 200 may perform the read process without performing processes of calculating the gain-correction value and generating the data-reproduction-signal gain from the write-reproduction-signal gain, using such gain-correction value.

Figure 12:
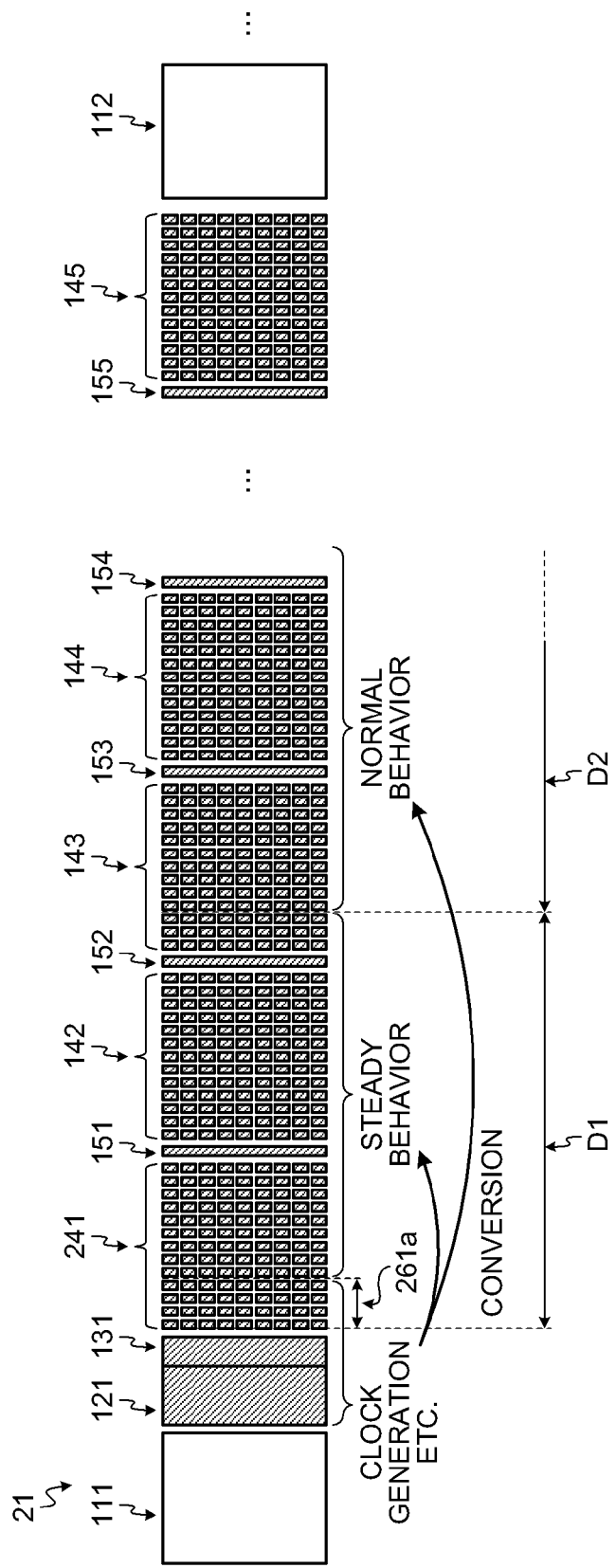
FIG. 12 is a diagram for explaining behavior at a time of the read process performed by the magnetic recording device according to the second embodiment.

Next, behavior at the time of the read process performed by the magnetic recording device 200 according to the second embodiment is explained. FIG. 12 is a diagram for explaining the behavior at a time of the read process by the magnetic recording device 200 according to the second embodiment. As illustrated in FIG. 12, the magnetic recording device 200 generates the write clock and calculates the write-reproduction-signal gain based on the write-reproduction signal read out from the write-synchronization preamble 121.

When detecting the read-synchronization preamble 261a, the magnetic recording device 200 generates the data-reproduction-signal gain based on the read-reproduction signal read out from the read-synchronization preamble 261a. Then, the magnetic recording device 200 switches the gain that the AGC 56 uses, from the write-reproduction-signal gain to the data-reproduction-signal gain. The magnetic recording device 200 generates the read clock by correcting the write clock using the phase-correction value.

Then, the magnetic recording device 200 amplifies the data-reproduction signal read out from a data region 241 in accordance with the data-reproduction-signal gain. Then, the magnetic recording device 200 obtains the data from the amplified data-reproduction signal using the above-described generated read clock. Every time the magnetic recording device 200 detects the Resync mark 151, the magnetic recording device 200 corrects the phase of the write clock and generates the read clock by correcting the write clock by the phase-correction value. Then, using the generated read clock, the magnetic recording device 200 obtains the data from the data-reproduction signal read out from the data region 142.

Figure 13:
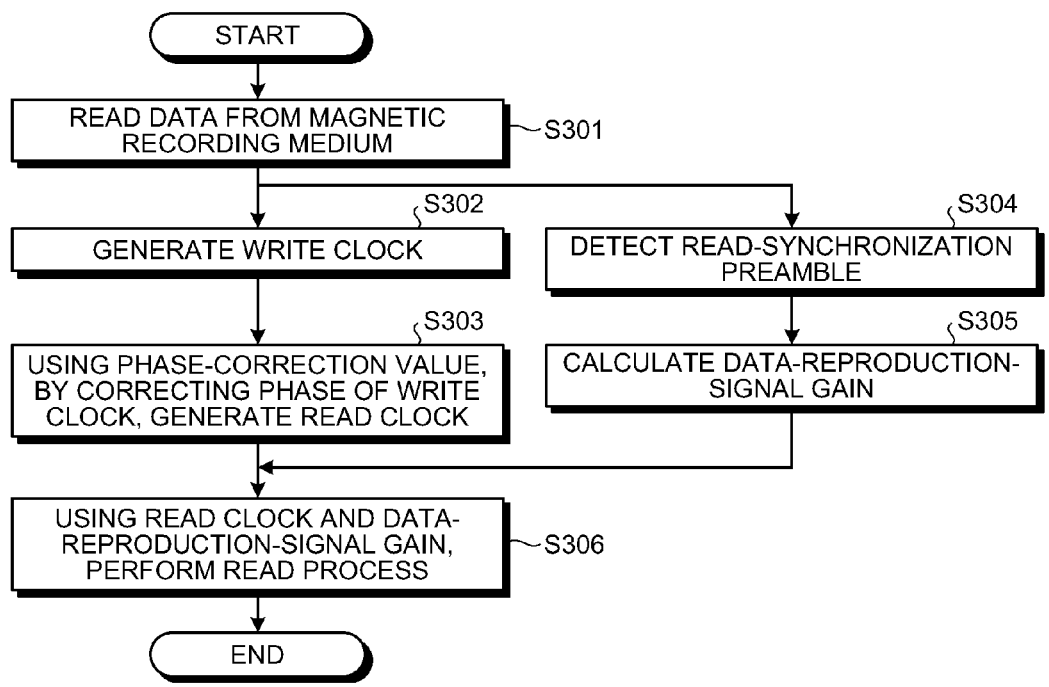
FIG. 13 is a flowchart illustrating a read process procedure performed by the magnetic recording device according to the second embodiment.

Next, the read process procedure performed by the magnetic recording device 200 according to the second embodiment is explained. FIG. 13 is a flowchart illustrating the read process procedure by the magnetic recording device 200 according to the second embodiment. When performing the read process, the head 13 of the magnetic recording device 200 first reads out the data from the magnetic recording medium 21 (step S301). At this time, the phase-correction-value output unit 83 of the MPU 80 outputs the phase-correction value stored in the correction-value storage unit 71 to the timing recovery 57.

Subsequently, based on the write-reproduction signal read out by the head 13, the write-clock generator 58 generates the write clock (step S302). By correcting the phase of the write clock input from the write-clock generator 58 using the phase-correction value, the timing recovery 57 generates the read clock (step S303).

Among the reproduction signal read out by the head 13, after the AGC 56 detects the read-reproduction signal read out from the read-synchronization preamble (step S304), based on the read-reproduction signal, the AGC 56 calculates the data-reproduction-signal gain (step S305). Using the generated read clock and the data-reproduction-signal gain, the magnetic recording device 200 performs the read process (step S306).

As described above, the magnetic recording medium 21 according to the second embodiment is provided with the read-synchronization preamble only at immediately posterior to the Sync mark. The magnetic recording device 200 according to the second embodiment generates the data-reproduction-signal gain based on the read-synchronization preamble. As a result, the magnetic recording device 200 may increase the capacity for storing the data without performing processes of calculating the gain-correction value and generating the data-reproduction-signal gain.

[c] Third Embodiment

The embodiments of the magnetic recording device disclosed in the present application have been explained. However, the magnetic recording device disclosed by the present application may also be embodied in various other different configurations than the embodiments described above.

(1) Device Configuration 1

For example, in the above-described first and second embodiments, an example of calculating the phase-correction value and gain-correction value in the phase-correction-value calculator 81 and the gain-correction-value calculator 82 included in the MPU 80, respectively, has been disclosed. However, the magnetic recording device may calculate the phase-correction value and gain-correction value by using a predetermined hardware inside the RDC.

Figure 14:
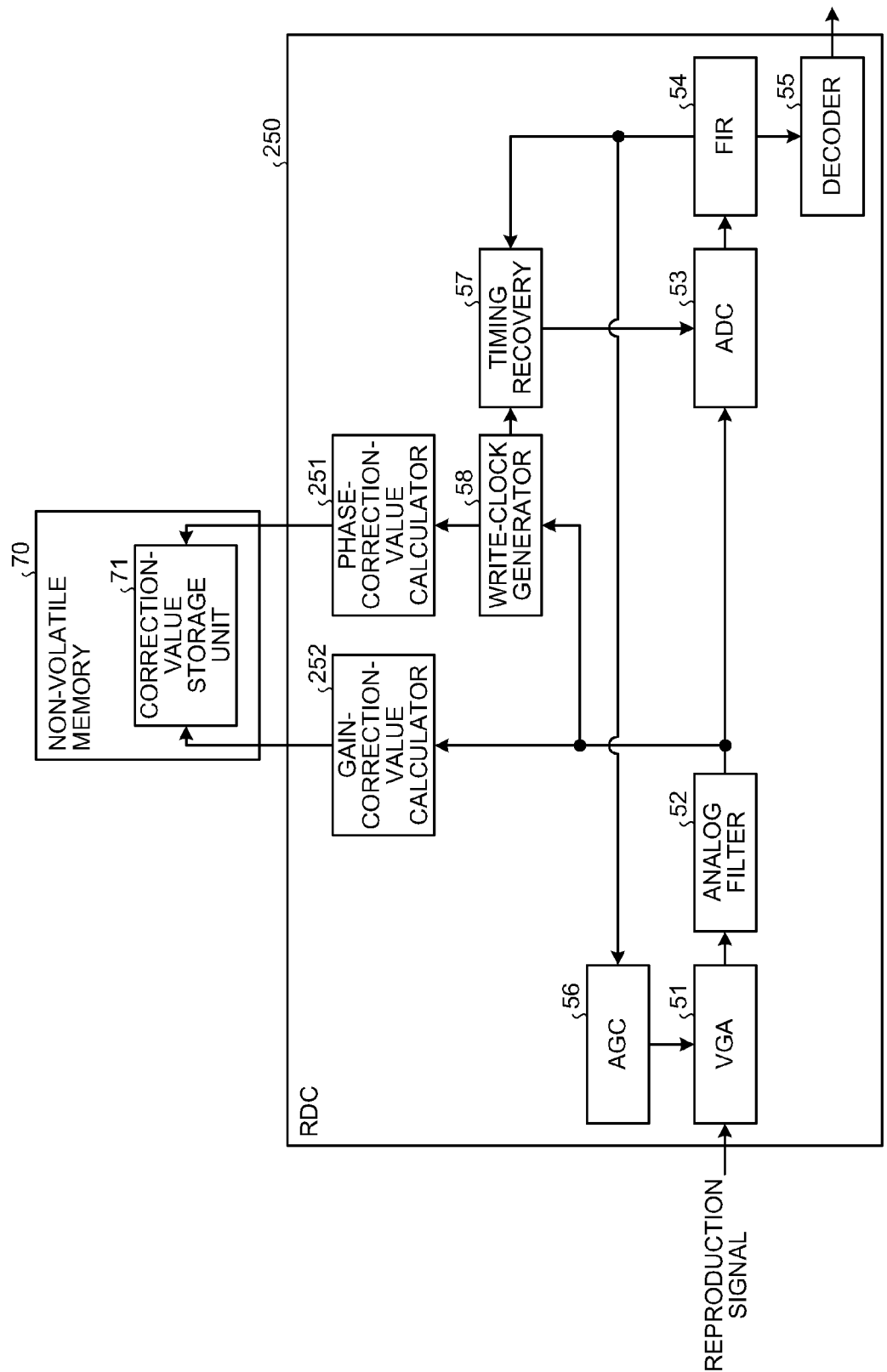
FIG. 14 is a diagram illustrating a configuration of a main section of a magnetic recording device according to a third embodiment.
Figure 15:
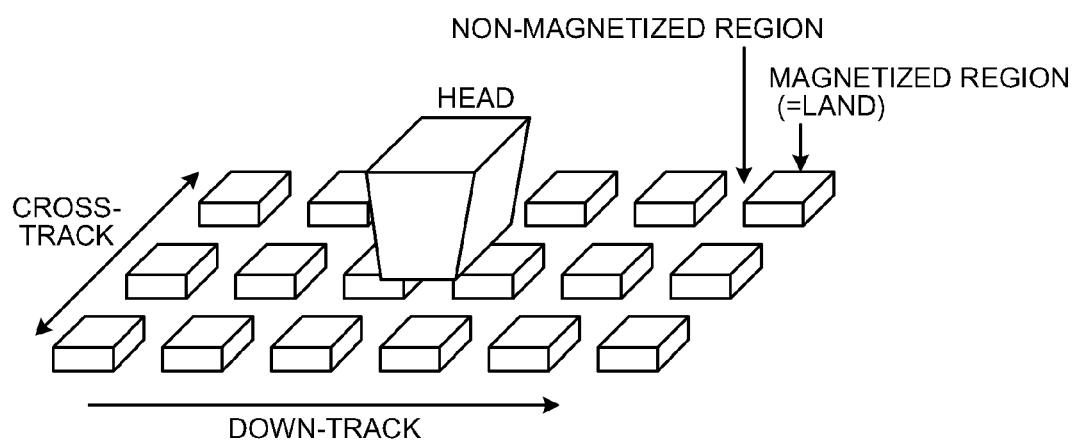
FIG. 15 is a diagram for explaining a conventional technology.

FIG. 14 is a diagram illustrating a configuration of a main section of a magnetic recording device 300 according to a third embodiment. As illustrated in FIG. 14, compared with the RDC 50 illustrated in FIG. 5, in the magnetic recording device 300, an RDC 250 newly includes a phase-correction-value calculator 251 and a gain-correction-value calculator 252.

The phase-correction-value calculator 251 calculates a phase-correction value which is a phase difference between the write clock input from the write-clock generator 58 and the read-reproduction signal input from the analog filter 52. Then, the phase-correction-value calculator 251 stores the calculated phase-correction value in the correction-value storage unit 71.

Based on the amplitude of the write-reproduction signal input from the analog filter 52 and the amplitude of the read-reproduction signal input from the analog filter 52, the gain-correction-value calculator 252 calculates a gain-correction value. Then, the gain-correction-value calculator 252 stores the calculated gain-correction value in the correction-value storage unit 71.

(2) Device Configuration 2

Each of the structural components of the magnetic recording device 100 and 200, illustrated in FIGS. 4 to 6 and FIG. 14, is only conceptual in function, and is not necessarily physically configured as illustrated in FIGS. 4 to 6 and FIG. 14. That is, the specific patterns of distribution and integration of the units in the magnetic recording device 100 or 200 are not limited to those illustrated in FIGS. 4 to 6 and FIG. 14. All or a part of the components may be functionally or physically distributed or integrated in arbitrary units, according to various loads and the state of use, and the like.

(3) Magnetic Recording Medium

The first and second embodiments are explained on an assumption that the magnetic recording medium is a patterned medium. However, the magnetic recording device disclosed in the present application may be applied to other magnetic recording media which are provided with preambles for every data sector. For example, the magnetic recording device disclosed in the present application may also be applied to a magnetic recording medium having a discrete track.

(4) Resync Mark

In the above-described first and second embodiments, an example in which the recording medium is provided with the Resync mark is explained. However, in the case of the magnetic recording device in which the phase of the clock does not gradually shift, such magnetic recording device may use a recording medium which is not provided with the Resync mark.

As another embodiment of the present invention, it is effective to apply the components of the magnetic recording device of the present application, or arbitrary combinations of expressions or components disclosed in the present application, to a method, apparatus, device, computer program, recording medium, data structure, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A magnetic recording device comprising:
   a magnetic recording medium that includes a write-synchronization region on which information for generating a write clock is recorded, and a data region on which data is recorded, the write clock being a timing for writing data;
   a reading unit configured to read out a signal from the magnetic recording medium;
   a write-clock generator configured to generate the write clock based on a write-reproduction signal which is a signal read out from the write-synchronization region by the reading unit;
   a phase-correction-value calculator configured to calculate a phase-correction value for correction of a phase of a read clock from the write clock based on a phase difference between the write-reproduction signal and a data-reproduction signal, which are read out by the reading unit;
   a correction-value-storage unit configured to store therein the phase-correction value calculated by the phase-correction-value calculator;
   a phase-correction unit configured to correct the phase of the write clock generated by the write-clock generator based on the phase-correction value stored in the correction-value-storage unit; and
   a data acquisition unit configured to acquire data included in a data-reproduction signal which is a signal read out from the data region by the reading unit based on a clock that is generated by correcting the phase by the phase-correction unit.

2. The magnetic recording device according to claim 1, further comprising:
   an amplifier configured to amplify the write-reproduction signal or the data-reproduction signal in accordance with a predetermined gain; and
   a gain-correction-value calculator configured to calculate a gain-correction value based on a relational expression of an amplitude of the write-reproduction signal and an amplitude of the data-reproduction signal, which are read out by the reading unit;
   a gain-correction unit configured to correct a write-reproduction-signal gain which is a gain calculated based on the write-reproduction signal, wherein
   the correction-value-storage unit further stores therein the gain-correction value for correcting the write-reproduction-signal gain to a data-reproduction-signal gain,
   the gain-correction unit corrects the write-reproduction-signal gain based on the gain-correction value stored in the correction-value-storage unit,
   the amplifier amplifies the data-reproduction signal in accordance with the data-reproduction-signal gain which is a gain generated by correcting the write-reproduction-signal gain by the gain-correction unit, and
   the data acquisition unit acquires the data from the data-reproduction signal that is amplified by the amplitude unit.

3. The magnetic recording device according to claim 2, further comprising,
   a writing unit configured to write data, from which the data-reproduction signal is read out, on the data region based on the write clock generated by the write-clock generator, wherein
   the reading unit reads out the data written by the writing unit;
   the phase-correction-value calculator calculates the phase-correction value based on a phase difference between the data-reproduction signal and the write-reproduction signal read out by the reading unit; and
   the gain-correction-value calculator calculates the gain-correction value based on an amplitude of the data-reproduction signal and an amplitude of the write reproduction signal read out by the reading unit.

4. The magnetic recording device according to claim 1, further comprising,
   a gain-correction-value calculator configured to calculate the gain-correction value based on an amplitude of the write-reproduction signal and an amplitude of the data-reproduction signal, which are read out by the reading unit, wherein
   the correction-value-storage unit stores therein the gain-correction value which is calculated by the gain-correction-value calculator.

5. The magnetic recording device according to claim 4, further comprising,
   a writing unit configured to write data, from which the data-reproduction signal is read out, on the data region based on the write clock generated by the write-clock generator, wherein
   the reading unit reads out the data written by the writing unit;
   the phase-correction-value calculator calculates the phase-correction value based on a phase difference between the data-reproduction signal and the write-reproduction signal read out by the reading unit; and the gain-correction-value calculator calculates the gain-correction value based on an amplitude of the data-reproduction signal and an amplitude of the write reproduction signal read out by the reading unit.

6. A control device that controls a magnetic recording device that includes a magnetic recording medium including a write-synchronization region on which information for generating a write clock is recorded, and a data region on which data is recorded, the write clock being a timing for writing the data, the control device comprising:
 a write-clock generator configured to generate the write clock based on a write-reproduction signal which is a signal read out from the write-synchronization region; and
 a phase-correction unit configured to correct a phase of the write clock generated by the write-clock generator based on a phase-correction value calculated for correcting a phase of a read clock from the write clock based on a phase difference between the write-reproduction signal and a data-reproduction signal and stored in a correction-value-storage unit.

7. The control device according to claim 6, further comprising:
 an amplifier configured to amplify the write-reproduction signal or a data-reproduction signal which is a signal read out from the data region based on a predetermined gain; and
 a gain-correction unit configured to correct the write-reproduction-signal gain which is a gain calculated based on the write-reproduction signal, wherein
 the correction-value-storage unit further stores therein a gain-correction value calculated based on a relational expression of an amplitude of the write-reproduction signal and an amplitude of the data-reproduction signal for correcting the write-reproduction-signal gain to a data-reproduction-signal gain,
 the gain-correction unit corrects the write-reproduction-signal gain based on the gain-correction value stored in the correction-value-storage unit, and
 the amplifier amplifies the data-reproduction signal in accordance with the data-reproduction-signal gain which is a gain generated by correcting the write-reproduction-signal gain by the gain-correction unit.

8. A magnetic recording device control method of controlling a magnetic recording device that includes a magnetic recording medium including a write-synchronization region on which information for generating a write clock is recorded, and a data region on which data is recorded, the write clock being a timing for writing the data, the control method comprising:
 allowing the a magnetic recording device to read out a signal from the magnetic recording medium;
 allowing the magnetic recording device to generate the write clock based on a write-reproduction signal which is a signal read out from the write-synchronization region in the reading-out of the signal;
 allowing the magnetic recording device to calculate a phase-correction value for correcting a phase of a read clock from the write clock based on a phase difference between the write-reproduction signal and a data-reproduction signal;
 allowing the magnetic recording device to correct the phase of the write clock generated in the generating the write clock based on the phase-correction value stored in a correction-value-storage unit; and
 allowing the magnetic recording device to acquire data included in a data-reproduction signal which is a signal read out from the data region in the reading of the read clock generated by correcting the phase in the correcting the phase.

9. The magnetic recording device control method according to claim 8, further comprising:
 amplifying the write-reproduction signal or the data-reproduction signal in accordance with a predetermined gain; and
 correcting the write-reproduction-signal gain which is a gain calculated based on the write-reproduction signal, wherein
 the correction-value-storage unit further stores therein a gain-correction value calculated based on a relational expression of an amplitude of the write-reproduction signal and an amplitude of the data-reproduction signal for correcting the write-reproduction-signal gain to a data-reproduction-signal gain,
 in the correcting, the write-reproduction-signal gain is corrected based on the gain-correction value stored in the correction-value-storage unit,
 in the amplifying, the data-reproduction signal is amplified in accordance with the data-reproduction-signal gain which is a gain generated by correcting the write-reproduction-signal gain by the gain-correction unit, and
 in the acquiring of the data, the data is acquired from the data-reproduction signal that is amplified in the amplifying.

* * * * *